US012717524B2

(12) United States Patent
Leonard et al.

(10) Patent No.: US 12,717,524 B2
(45) **Date of Patent: *Aug. 25, 2026**

(54) DYNAMIC ADJUSTMENT OF DATA STORAGE FOR ENHANCED DATA RETENTION

(71) Applicant: Micron Technology, Inc., Boise, ID (US)

(72) Inventors: Roy Leonard, San Jose, CA (US); Xiaolei Man, Shanghai (CN); Bryan Li, Shanghai (CN); Peijing Ye, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/933,047

(22) Filed: Oct. 31, 2024

(65) Prior Publication Data

US 2025/0060909 A1 Feb. 20, 2025

Related U.S. Application Data

(63) Continuation of application No. 18/503,275, filed on Nov. 7, 2023, now Pat. No. 12,182,452, which is a continuation of application No. 17/698,182, filed on Mar. 18, 2022, now Pat. No. 11,861,234.

(51) Int. Cl.
*G06F 3/06* (2006.01)
*G06F 12/0811* (2016.01)

(52) U.S. Cl.
CPC .......... *G06F 3/0659* (2013.01); *G06F 3/0604* (2013.01); *G06F 3/0635* (2013.01); *G06F 3/0679* (2013.01); *G06F 12/0811* (2013.01)

(58) Field of Classification Search
CPC .... G06F 3/0659; G06F 3/0604; G06F 3/0635; G06F 3/0679; G06F 12/0811
See application file for complete search history.

(56) References Cited

U.S. PATENT DOCUMENTS

2011/0252187 A1* 10/2011 Segal .................. G06F 12/0246 711/E12.008
2015/0213896 A1* 7/2015 Lieber ................ G11C 16/3495 711/103
2019/0065080 A1* 2/2019 Tanpairoj ............ G06F 12/0246
2019/0228827 A1 7/2019 Syu et al.
2020/0133874 A1* 4/2020 Christensen .......... G06F 3/0634
2020/0167089 A1* 5/2020 Natarajan .............. G11C 16/10
2021/0011767 A1* 1/2021 Luo ........................ G06F 3/0616
2022/0206696 A1* 6/2022 Gao ........................ G06F 3/061
2022/0300193 A1* 9/2022 Gao ........................ G06F 3/061

* cited by examiner

*Primary Examiner* — Prasith Thammavong
(74) *Attorney, Agent, or Firm* — Lowenstein Sandler LLP

(57) ABSTRACT

A system includes a memory and a processing device, operatively coupled to the memory, to perform operations including initiating a write operation in a first mode to write a first portion of data to a cache, determining whether a logical saturation of the first portion of the data satisfies a first threshold condition based on the first maximum size, and in response to determining that the logical saturation of the first portion of the data satisfies the first threshold condition, continuing the write operation in the second mode to write a second portion of the data to the cache. The cache has a first maximum size corresponding to the first mode and a second maximum size greater than the first maximum size corresponding to a second mode.

20 Claims, 8 Drawing Sheets

DYNAMIC ADJUSTMENT OF DATA STORAGE FOR ENHANCED DATA RETENTION

CROSS-REFERENCE TO RELATED APPLICATION(S)

The present application is a continuation of U.S. patent application Ser. No. 18/503,275, filed on Nov. 7, 2023, which is a continuation of U.S. patent application Ser. No. 17/698,182, filed on Mar. 18, 2022, which is now issued as U.S. Pat. No. 11,861,234, on Jan. 2, 2024, the entire contents of each of which are hereby incorporated by reference herein.

TECHNICAL FIELD

Embodiments of the disclosure relate generally to memory sub-systems, and more specifically, relate to dynamic adjustment of data storage for enhanced data retention.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
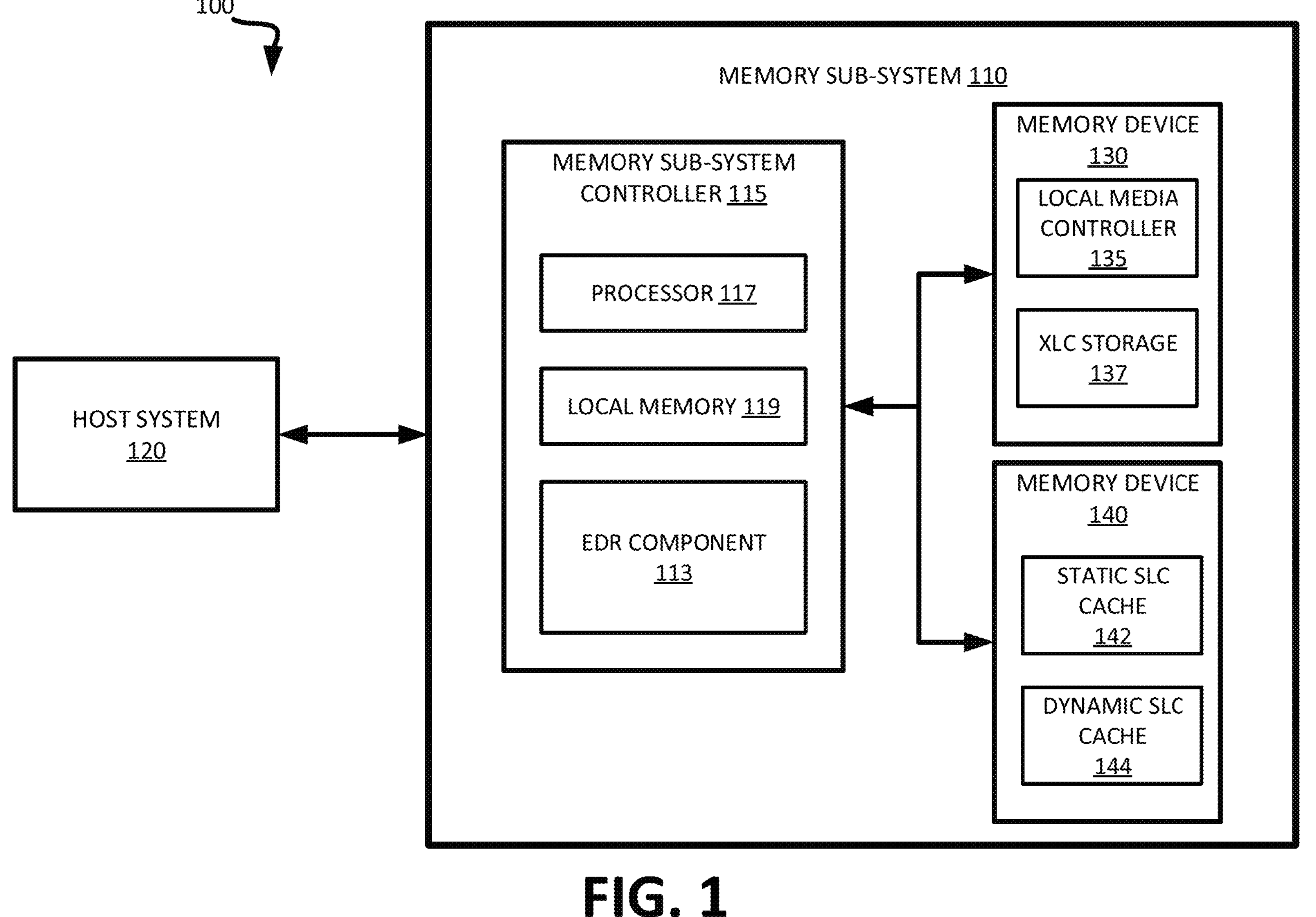
FIG. 1 illustrates an example computing system that includes a memory sub-system, in accordance with some embodiments of the present disclosure.

Aspects of the present disclosure are directed to dynamic adjustment of data storage for enhanced data retention. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple bits arranged in a two-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell can be programmed (written to) by applying a certain voltage to the memory cell, which results in an electric charge being held by the memory cell. For example, a voltage signal $V_{CG}$ that can be applied to a control electrode of the cell to open the cell to the flow of electric current across the cell, between a source electrode and a drain electrode. More specifically, for each individual memory cell (having a charge Q stored thereon) there can be a threshold control gate voltage $V_T$ (herein also referred to as the "threshold voltage" or simply as "threshold") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The memory cells can, therefore, be characterized by a distribution P of the threshold voltages, $P(Q, V_T)=dW/dV_T$, where dW represents the probability that any given cell has its threshold voltage within the interval $[V_T, V_T+dV_T]$ when charge Q is placed on the cell.

A memory device can have distributions $P(Q, V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the memory cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. This effectively allows a single memory cell to store multiple bits of information: a memory cell operated with 2N−1 well-defined valley margins and 2N valleys is capable of reliably storing N bits of information. Specifically, the read operation can be performed by comparing the measured threshold voltage $V_T$ exhibited by the memory cell to one or more reference voltage levels corresponding to known valley margins (e.g., centers of the margins) of the memory device.

One type of memory cell ("cell") is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCS, PLCs, etc. or any combination of such. For example, a memory device can include an SLC portion, and an MLC portion, a TLC portion, a QLC portion, or a PLC portion of memory cells.

Some memory sub-systems (e.g., SSDs) implement SLC caching for storing data. SLC caching utilizes SLC cache along with XLC storage. An XLC cell is a multiple level cell that stores more than one bit of state information per cell (e.g., MLC, TLC, QLC, PLC, as described above). SLC caching can be used to improve write speed since programming data on SLC cells is generally faster than programming data on XLC cells. Data written to the SLC cache can later be moved, asynchronously with respect to writing operations, from SLC cache to XLC storage to make room for future writes to the SCL cache (e.g., 1 bit in SLC cache can take up the same space as 4 bits in QLC storage). For example, the data can be moved in the background or during idle times to maintain performance. The SLC cache size can be selected in view of physical memory device constraints. For example, the SLC cache size can have a fixed size that does not exceed the available number of blocks on the memory device (e.g., NAND).

The memory sub-system can utilize a SLC cache behavior profile specifying at least one of: size rules of the cache (e.g., rules for increasing or decreasing the cache), usage rules of the cache, rules specifying the location of the cache, etc. The SLC cache behavior profile may include a single configuration rule, or multiple rules. For example, an initial SLC cache behavior profile may be loaded by a manufacturer onto the memory sub-system at the time of manufacture. The SLC cache behavior profile can be a static profile that remains unchanged over time. For example, the initial SLC cache behavior profile can persist through the life of the memory sub-system. Alternatively, the SLC cache behavior profile can be a dynamic profile that can be updated or replaced with an updated SLC cache behavior profile via a communications interface. For example, device usage characteristics may change (e.g., usage behavior of the device in which the memory sub-system is installed), and thus the host may replace the SLC cache behavior profile over the communications interface. Illustratively, a smartphone may receive an over the air (OTA) update that specifies an updated SLC cache behavior profile that modifies the performance characteristics of the memory sub-system in response to a change in usage behavior of the smartphone.

Data retention refers to the ability of a cell to retain its state information over a period of time in an operational state (e.g., powered on state) or a non-operational state (e.g., powered off state). For example, $V_T$ distributions can shift due to factors such as time, temperature, program/erase cycles, etc. $V_T$ distribution shifts can contribute to read errors, and therefore decrease memory sub-system performance. Illustratively, data retention can be challenging when a memory sub-system in a non-operational state is stored in a high temperature environment over a long period of time. For example, a memory sub-system can be stored in a high temperature warehouse after manufacture. Data retention can have a greater impact on data stored in XLC cells, as data retention for data stored on XLC cells can be shorter than data retention for data stored on XLC cells. However, typical SLC caching methods do not take into account data retention considerations, such as the storage of non-operational memory sub-systems within high temperature environments.

Aspects of the present disclosure address the above and other deficiencies by providing a memory sub-system that implements dynamic adjustment of data storage for enhanced data retention. A memory sub-system described herein can include SLC cache and XLC storage. The SLC cache can include a static SLC cache having a fixed logical saturation size ("fixed size") and a dynamic SLC cache having a dynamic (e.g. modifiable or configurable) maximum logical saturation size ("dynamic maximum size"). Logical saturation refers to a portion of logical locations (e.g., logical block addresses (LBAs)) that contain data (e.g., a ratio of the size of the logical locations that contain data to the total size of the logical locations). In contrast to logical saturation, physical saturation refers to a portion of physical locations (e.g., physical NAND locations) that contain data (e.g., a ratio of the size of the physical locations that contain data to the total size of the physical locations).

The fixed size of static SLC cache can be expressed as a share of a storage capacity of the memory sub-system ("memory sub-system storage capacity"). Thus, the static SLC cache can store an amount of data having a logical saturation up to the fixed size. The dynamic SLC cache can have a default or base maximum logical saturation size ("default maximum size"). The default maximum size can expressed as another share of the memory sub-system storage capacity. Thus, when the dynamic SLC cache size is set at the default maximum size, the dynamic SLC cache can store an amount of data having a logical saturation up to the default maximum size. An increase of the maximum size of dynamic SLC cache can be limited by a theoretical maximum logical saturation size ("theoretical maximum size"). The theoretical maximum size can be defined by the memory sub-system storage capacity and the type of XLC storage (e.g., memory sub-system storage capacity divided by bits per XLC cell). For example, if the XLC storage is QLC storage, then the theoretical maximum size can be 25% of the memory sub-system storage capacity. Thus, when the dynamic SLC cache size is set at the theoretical maximum size, the dynamic SLC cache can store an amount of data having a logical saturation up to the theoretical maximum size. These sizes can be predetermined by the manufacturer at the time of manufacture, and maintained in the SLC cache behavior profile stored in the memory sub-system.

The memory sub-system can be operatively coupled to a host system. The host system can provide data for storage on the memory sub-system. A memory sub-system controller can operate in a default mode or an enhanced data retention mode. For example, metadata indicating the mode can be maintained in the SLC cache behavior profile. When operating in the default mode, the dynamic SLC cache has the default maximum size described above, and the memory sub-system controller can cause data to be moved from SLC cache to XLC storage in the background or during idle times.

When operating in the enhanced data retention mode, the memory sub-system controller can increase the maximum size of the dynamic SLC cache from the default maximum size to an enhanced maximum logical saturation size ("enhanced maximum size") to enable continued writes to SLC cache. For example, the memory sub-system can initially operate in the enhanced data retention mode (e.g., as indicated by metadata maintained in the SLC cache behavior profile). As another example, the memory sub-system can switch from the default mode to the enhanced data retention mode upon determining that logical saturation of data stored on dynamic SLC cache is greater than the default maximum size. The enhanced maximum size is greater than the default maximum size, and less than or equal to the theoretical maximum size described above. For example, the enhanced maximum size can be selected to be less than the theoretical maximum size to maintain desired memory sub-system performance by limiting the impact of moving data from SLC cache to XLC storage. In some embodiments, the enhanced maximum size is 20% of the memory sub-system storage capacity. However such an example should not be considered limiting. The enhanced maximum size can be predetermined by the manufacturer at the time of manufacture, and stored in the SLC cache behavior profile maintained by the memory sub-system.

In the event that the amount of data being written to the memory sub-system (e.g., the number of bytes) were to exceed the maximum amount of data that can be written to the memory sub-system, the memory sub-system controller can cause certain data to be moved to XLC storage (e.g., temporary files) to make room for further writes to the SLC cache. The host system may also decide to delete existing data in the SLC cache or XLC storage so that the remaining memory can be moved and retained in SLC cache. For example, the amount of data written to the memory sub-system can measured in terabytes written (TBW) to the memory sub-system. As mentioned above, the memory sub-system manufacturer can set the various SLC cache sizes (e.g., static SLC cache size, default maximum size, enhanced maximum size) at the time of memory sub-system manufacture within an SLC cache behavior profile maintained on the memory sub-system. By increasing the size of the dynamic SLC cache to the enhanced maximum size and keeping data stored in SLC cache while in the enhanced data retention mode, embodiments described herein can improve data retention when the memory sub-system is placed in the high temperature environment.

After storing the data in SLC cache, the memory sub-system can then be placed in the high temperature environment while in a non-operational state. Since the data is maintained only in SLC cache, and not XLC storage, concerns related to the high temperature affecting XLC data retention are alleviated. After the memory sub-system is removed from the high temperature environment, the memory sub-system can be placed into an operational state (e.g., a user starts utilizing the memory sub-system). To improve memory sub-system performance, the memory sub-system can operate in the default mode while in the operational state to reduce the maximum size of the dynamic SLC cache back to the default maximum size and to move data from SLC cache to QLC storage. For example, as described above, memory sub-system performance can decrease as the maximum dynamic SLC cache size increases.

Illustratively, for a memory sub-system having QLC storage and a storage capacity or maximum logical saturation of 512 gigabytes (GB), the static SLC cache size can be about 1% of the memory sub-system storage capacity (5 GB), the default maximum size of the dynamic SLC cache can be 10% of the memory sub-system storage capacity (51 GB), the enhanced maximum size of the dynamic SLC cache can be 20% of the memory sub-system storage capacity (102 GB) and the theoretical maximum size of the dynamic SLC cache can be 25% of the memory sub-system storage capacity (128 GB). Thus, in this example, the enhanced maximum size is double the default maximum size. However, such an example should not be considered limiting.

If a host system were to write 100 GB to this memory sub-system (e.g., an operating system (OS) image), the memory sub-system controller could choose to write the first 5 GB to static SLC cache, and the next 51 GB to dynamic SLC cache. When operating in the default mode, the memory sub-system controller would move the 56 GB of data from SLC cache to QLC storage during idle time or in the background. Once the SLC cache has been freed up after moving the data to XLC storage, the memory sub-system controller would then write the remaining 44 GB of data to SLC cache, and then move the 44 GB of data to QLC storage during idle time or in the background.

To prevent data from being stored in QLC storage prior to placing the memory sub-system, in a non-operational state, within a high temperature environment (e.g., warehouse within a factory) and thus improve data retention, the memory sub-system controller can operate in the enhanced data retention mode. For example, if the logical saturation of the dynamic SLC cache exceeds the default maximum size of 51 GB, the memory sub-system controller can cause the size of the dynamic SLC cache to increase to 102 GB. By increasing the maximum size of dynamic SLC cache to the enhanced maximum size, the memory sub-system controller can continue to write the remaining 44 GB of data to SLC cache without moving data to QLC storage. Further details regarding the operations performed by the memory sub-system controller will be described below with reference to FIGS. 1-5.

Advantages of the present disclosure include, but are not limited to, improved memory device performance. For example, implementations described herein can improve data retention, and therefore decrease error rates.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes an enhanced data retention (EDR) component 113 that can implement dynamic adjustment of data storage for enhanced data retention. In some embodiments, the memory sub-system controller 115 includes at least a portion of the EDR component 113. In some embodiments, the EDR component 113 is part of the host system 120, an application, or an operating system. In other embodiments, local media controller 135 includes at least a portion of EDR component 113 and is configured to perform the functionality described herein.

For example, the memory device 130 can further include XLC storage 137 (e.g., MLC, TLC, QLC, PLC), and the memory device 140 can include static SLC cache 142 and dynamic SLC cache 144. The static SLC cache 142 can have a fixed logical saturation size ("fixed size") and the dynamic SLC cache 144 having a dynamic (e.g. modifiable or configurable) maximum logical saturation size ("dynamic maximum size"). For example, the fixed size of the static SLC cache 142 can be less than or equal to an available number of blocks on the memory device 130. The fixed size can be expressed as a share (e.g., percentage) of a storage capacity of the memory sub-system 110 ("memory sub-system storage capacity"). The dynamic SLC cache 144 can have a default or base logical maximum saturation size ("default maximum size"). The default maximum size can expressed as a share (e.g., percentage) of the storage capacity of the memory sub-system 110. The size of dynamic SLC cache 144 can be limited by a theoretical maximum logical saturation size ("theoretical maximum size") determined by the memory sub-system storage capacity and the type of XLC storage 137 (e.g., memory sub-system storage capacity divided by bits per XLC cell). For example, if XLC storage 137 is QLC storage, then the theoretical maximum size can be 25% of the memory sub-system storage capacity.

The EDR component 113 can receive data from the host system 120, and write data to the memory device 130. To do so, the EDR component 113 can operate in the default mode or the enhanced data retention mode. For example, metadata indicating the mode can be maintained in the SLC cache behavior profile. When operating in the default mode, the dynamic SLC cache of the memory device 130 has the default maximum size, and the EDR component 113 can cause data to be moved from the SLC cache of the memory device 140 (e.g., static SLC cache 142 and dynamic SLC cache 144) to the XLC storage 137 in the background or during idle times.

When operating in the enhanced data retention mode, the EDR component 113 can increase the maximum size of the dynamic SLC cache 144 from the default maximum size to an enhanced maximum logical saturation size ("enhanced maximum size") to enable continued writes to SLC cache. For example, the memory sub-system 110 can initially operate in the enhanced data retention mode (e.g., as indicated by metadata maintained in the SLC cache behavior profile). As another example, the memory sub-system 110 can switch from the default mode to the enhanced data retention mode upon determining that logical saturation of data stored on dynamic SLC cache is greater than the default maximum size. The enhanced maximum size is greater than the default maximum size, and less than or equal to the theoretical size. For example, the enhanced maximum size can be selected to be less than the theoretical maximum size to maintain desired performance of the memory sub-system 110. The enhanced maximum size can be predetermined by the manufacturer at the time of manufacture, and stored in the SLC cache behavior profile maintained by the memory sub-system 110.

In the event that the amount of data written to the memory sub-system 110 (e.g., the number of bytes) were to exceed the maximum amount of data that can be written to the memory sub-system 110, the EDR component 113 can cause data to be moved to XLC storage 137 (e.g., temporary files) to make room for further writes to SLC cache. The host system 120 may also decide to delete existing data in SLC cache (e.g., dynamic SLC cache 144) or XLC storage 137 so that the remaining memory can be removed and retained in SLC cache. For example, the amount of data written to the memory sub-system 110 can be measured in terabytes written (TBW) to the memory sub-system 110. The various SLC cache sizes (e.g., static SLC cache size, default maximum size, enhanced maximum size) can be set by the manufacturer at the time of manufacture of the memory sub-system 110, and can be maintained within an SLC cache behavior profile stored on the memory sub-system 110 (e.g., as firmware within the memory sub-system controller 115). By increasing the size of the dynamic SLC cache 144 to the enhanced maximum size to enable storage of data in SLC cache only, embodiments described herein can improve data retention when the memory sub-system 110 is placed in the high temperature environment. Further details regarding the operation of the EDR component 113 are described below with reference to FIGS. 2-4.

Figure 2:
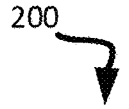
FIGS. 2-4 are flow diagrams of example methods for implementing dynamic adjustment of data storage for enhanced data retention, in accordance with some embodiments of the present disclosure.
Figure 2:
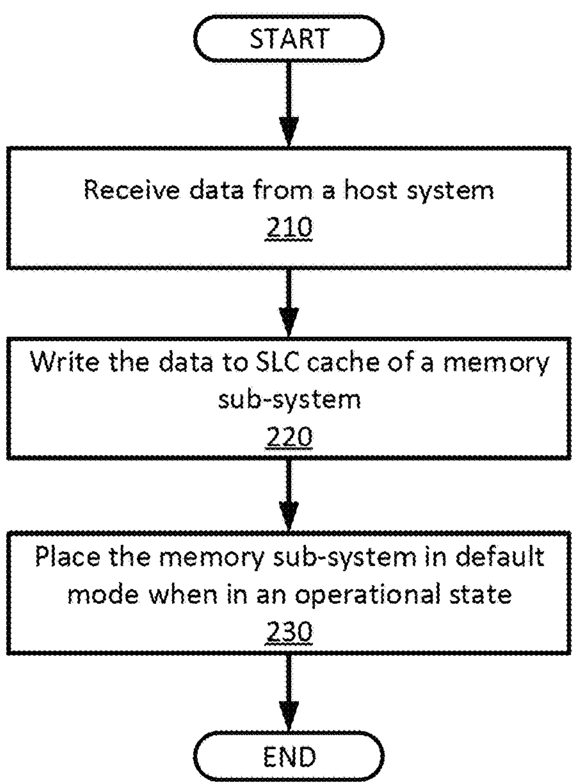

FIG. 2 is a flow diagram of an example method 200 for implementing dynamic adjustment of data storage for enhanced data retention, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the EDR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic receives data from a host system. For example, the host system can be the host system 120 of FIG. 1. In some embodiments, the data includes OS image data having a particular size. For example, the size of the OS image data can be 100 GB.

At operation 220, the processing logic writes the data to SLC cache of the memory sub-system. For example, the memory sub-system can include SLC cache and XLC storage (e.g., MLC storage, TLC storage, QLC storage, or PLC storage) and the data is written only to SLC cache. The SLC cache includes static SLC cache having a fixed logical saturation size ("fixed size") and dynamic SLC cache having a dynamic (e.g., modifiable or configurable) maximum logical saturation size ("dynamic maximum size") controlled by the processing logic. For example, the fixed size of the static SLC cache can be a share (e.g., percentage) of the storage capacity of the memory sub-system ("memory sub-system storage capacity"). In some embodiments, the fixed size is 1% of the memory sub-system storage capacity. Illustratively, if the memory sub-system storage capacity is 512 GB, then the fixed size can be 5 GB. The size of dynamic SLC cache can be limited by a theoretical maximum logical saturation size ("theoretical maximum size") determined by the memory sub-system storage capacity and the type of XLC storage (e.g., memory sub-system storage capacity divided by bits per XLC cell). In some embodiments, the XLC storage is QLC storage, and the theoretical maximum size is 25% of the memory sub-system storage capacity. For example, if the memory sub-system storage capacity is 512 GB, then the theoretical maximum size is 128 GB.

The processing logic can operate in a particular operating mode for managing data storage between SLC cache and XLC storage. For example, the operating mode can be a default mode or an enhanced data retention mode. The operating mode can be determined based on metadata indicating the mode that is maintained by the memory sub-system (e.g., in the SLC cache behavior profile.

In the default mode, the dynamic SLC cache has a default maximum logical saturation size ("default maximum size") less than the theoretical maximum size. For example, the default maximum size can be a share (e.g., percentage) of the memory sub-system storage capacity. In some embodiments, the default maximum size is 10% of the memory sub-system storage capacity. For example, if the memory sub-system storage capacity is 512 GB, then the default maximum size is 51 GB. In the enhanced data retention mode, the dynamic SLC cache has an enhanced maximum logical saturation size ("enhanced maximum size") greater than the default maximum size, and less than or equal to the theoretical maximum size. For example, the enhanced maximum size can be a percentage of the memory sub-system storage capacity less than or equal to the theoretical maximum size. To improve memory sub-system performance, the enhanced maximum size can be less than the theoretical maximum size. In some embodiments, the enhanced maximum size is 20% of the memory sub-system storage capacity. For example, if the memory sub-system storage capacity is 512 GB, then the default maximum size is 102 GB.

In some embodiments, writing the data to SLC cache at operation 220 includes determining whether to initiate a write operation in the enhanced data retention mode. In response to determining to initiate the write operation in the enhanced data retention mode, writing the data to SLC cache includes initiating the write operation in the enhanced data retention mode to write a portion of the data to the SLC cache. Further details regarding initiating data writes to SLC cache in the enhanced data retention mode will be described below with reference to FIG. 3. In some embodiments, writing the data to SLC cache at operation 220 includes determining whether to initiate a write operation in the default mode. In response to determining to initiate the write operation in the default mode, writing the data to SLC cache includes initiating the write operation in the default mode to write the portion of the data to the SLC cache. Further details regarding initiating data writes to SLC cache in the default mode will be described below with reference to FIG. 4.

After all the data is written to SLC cache, the memory sub-system can be placed in a high temperature environment (e.g., warehouse) while in a non-operational state. After some amount of time, the memory sub-system can be given to a user. Thus, at operation 230, the processing logic can place the memory sub-system in the default mode when in an operational state. In the default mode, the maximum size of dynamic SLC cache is reduced back to the default maximum size and data can begin moving from SLC cache to XLC storage.

Figure 3:
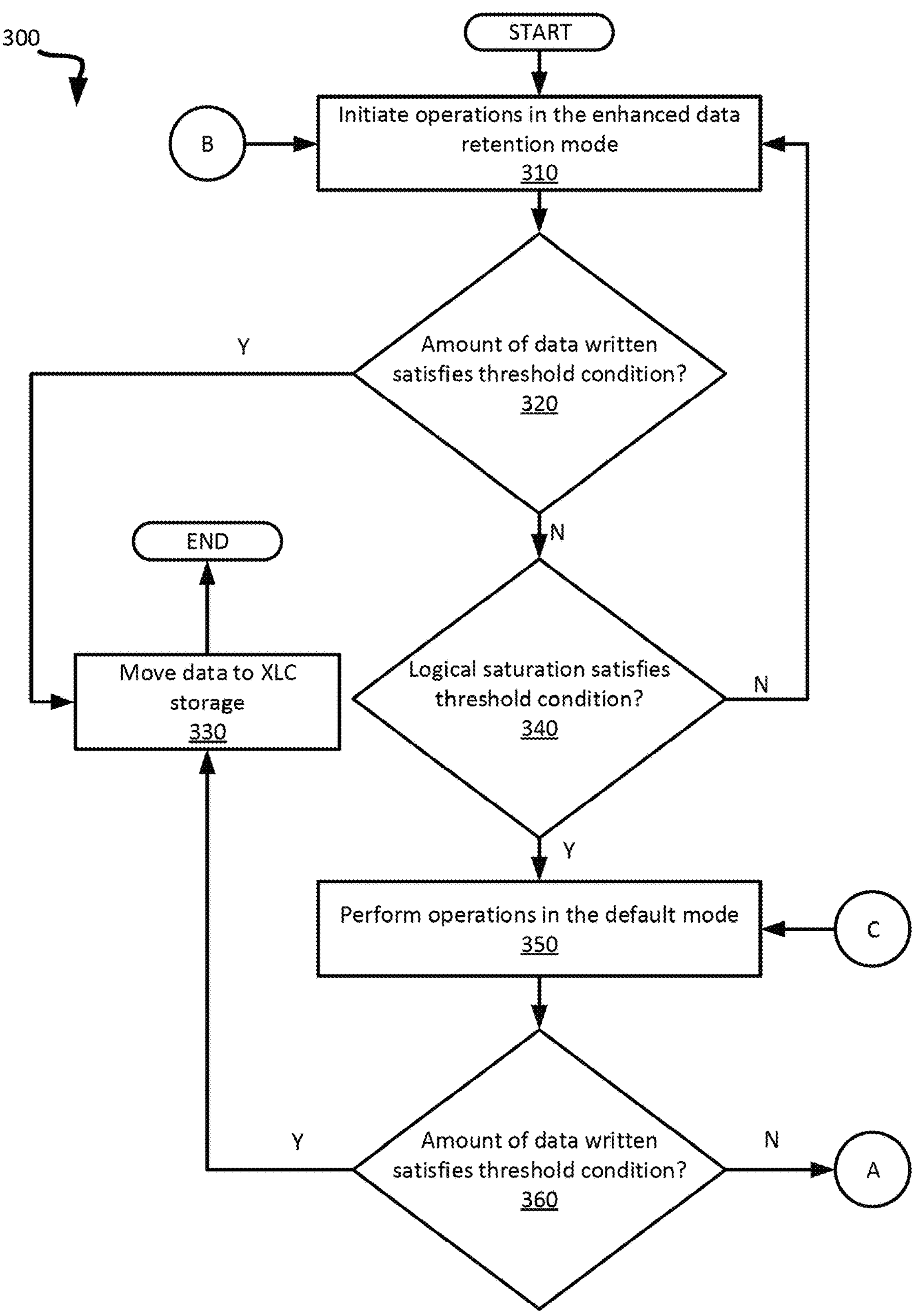
Figure 3:
Figure 3:
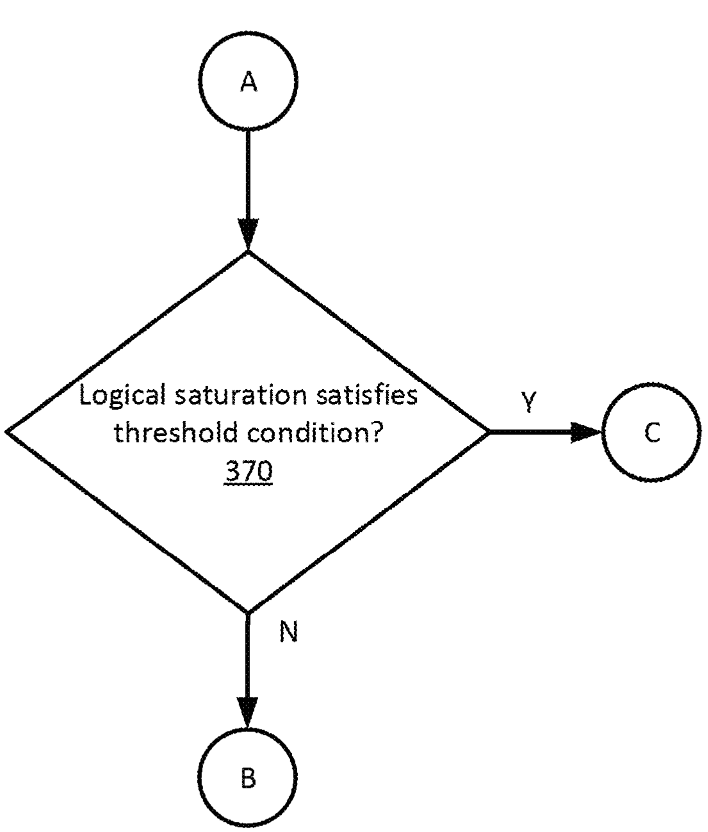

FIG. 3 is a flow diagram of an example method 300 for writing data to SLC cache of a memory sub-system (e.g., operation 220 of FIG. 2), in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the EDR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, processing logic initiates operations while the memory sub-system in the enhanced data retention mode. For example, the processing logic can initiate writes to SLC cache of the memory sub-system in the enhanced data retention mode. The memory sub-system can be empty (e.g., zero logical saturation). It is assumed that the processing logic received data to write to SLC from a host system (e.g., operation 210 of FIG. 2). For example, as described above with reference to FIGS. 1-2, the SLC cache can include static SLC cache having a fixed size and dynamic SLC cache having a default maximum size in the default mode and an enhanced maximum size greater than the default maximum size in the enhanced data retention mode, and the memory sub-system can further include XLC storage. The enhanced maximum size can be less than or equal to a theoretical maximum size determined based on the memory sub-system storage capacity and the type of XLC storage. In some embodiments, the enhanced maximum size is less than the theoretical maximum size.

At operation 320, the processing logic determines whether an amount of data written to the memory sub-system satisfies a threshold condition. For example, the processing logic can determine whether the amount of data written to the memory sub-system is greater than a data threshold. The amount of data written to the memory sub-system can be a cumulative amount of data written over the lifetime of the memory sub-system. The amount of data written to the memory sub-system can be a number of bytes written to the memory sub-system. In some embodiments, the amount of data written to the memory sub-system is measured in terabytes written (TBW).

The amount of data written to the memory sub-system can reflect the physical saturation of data within the memory sub-system. Illustratively, assume that the first 50 GB of data is written 10 times. Although the logical saturation is 50 GB, the physical saturation is 500 GB (0.5 TB).

If the amount of data written to the memory sub-system satisfies the threshold condition (e.g., the amount of data written to the memory sub-system is greater than the data threshold), this implies that the memory sub-system is outside of the production facility (e.g., factory) and will not be subject to the high temperature environment for storage. The processing logic can switch to the default mode (as described above with reference to FIGS. 1-2) to enable data movement from SLC cache to XLC storage at operation 330 and the process ends.

Otherwise, if the amount of data written to the memory sub-system does not satisfy the threshold condition (e.g., the amount of data written to the memory sub-system is less than or equal to the data threshold), this implies that the memory sub-system is still in the production facility and will be subject to the high temperature environment for storage. The processing logic can then determine, at operation 340, whether the logical saturation satisfies a threshold condition. For example, the processing logic can determine whether the amount of data written to SLC cache is greater than the total maximum size of SLC cache. Assuming that data is written to static SLC cache before dynamic SLC cache, this is equivalent to determining whether the amount of data written to dynamic SLC cache is greater than the enhanced maximum size.

If the logical saturation does not satisfy the threshold condition at operation 340 (e.g., the amount of data written to SLC cache is less than or equal to the total maximum size of SLC cache), this means that there is still space in dynamic SLC cache to continue writes to dynamic SLC cache. Thus, the process reverts back to operation 310 to continue writing to SLC cache in the enhanced data retention mode.

Otherwise, if the logical saturation does not satisfy the enhanced threshold condition (e.g., the amount of data written to SLC cache is greater than the total maximum size of SLC cache), this means that SLC cache is filled beyond the total maximum size of SLC cache. Therefore, a portion of the data will be written to XLC storage. Illustratively, if the enhanced maximum size of dynamic SLC cache is 20% of the memory sub-system storage capacity, but the logical saturation of the data is 25% of the memory sub-system storage capacity, then the 5% difference can be written to XLC storage.

To address this situation, the host system (e.g., host system 120 of FIG. 1) can erase or delete data (e.g., temporary files) to reduce the logical saturation to below the enhanced maximum size. Illustratively, if the logical saturation of the data is 25% of the memory sub-system storage capacity, then the remaining data after the data deletion can be 15% of the memory sub-system storage capacity. Moreover, at operation 350, the processing logic causes the memory sub-system to perform operations in the default mode. For example, the processing logic can enable data movement from SLC cache to XLC storage. Operating in default mode also reduces the size of dynamic SLC cache from the enhanced maximum size to the default maximum size.

At operation 360, the processing logic determines whether an amount of data written to the memory sub-system satisfies a threshold condition (similar to operation 320). Thus, if the amount of data written to the memory sub-system satisfies the threshold condition (e.g., the amount of data written to the memory sub-system is greater than the data threshold), the processing logic can then enable data movement from SLC cache to XLC storage at operation 330 and the process ends.

Otherwise, if the amount of data written to the memory sub-system does not satisfy the threshold condition (e.g., the amount of data written to the memory sub-system is less than or equal to the data threshold), the processing logic can then determine, at operation 370, whether the logical saturation satisfies a threshold condition. For example, the processing logic can determine whether the amount of data written to SLC cache is greater than the total maximum size of SLC cache. Assuming that data is written to static SLC cache before dynamic SLC cache, this is equivalent to determining whether the amount of data written to dynamic SLC cache is greater than the default maximum size.

If the logical saturation does not satisfy the threshold condition at operation 370 (e.g., the amount of data written to SLC cache is less than or equal to the total size of SLC cache), then the process reverts back to operation 310 to perform operations in the enhanced data retention mode. To do so, the processing logic can cause data to be moved to SLC cache and cause the size of dynamic SLC cache to be increased to the enhanced maximum size. Otherwise, if the logical saturation satisfies the threshold condition at operation 370 (e.g., the amount of data written to SLC cache is greater than the total size of SLC cache), this means that SLC cache is filled to capacity. The process can then revert back to operation 350 to perform operations in the default mode (e.g., enable data movement from SLC cache to XLC storage and reduce the size of dynamic SLC cache to the default maximum size).

Figure 4:
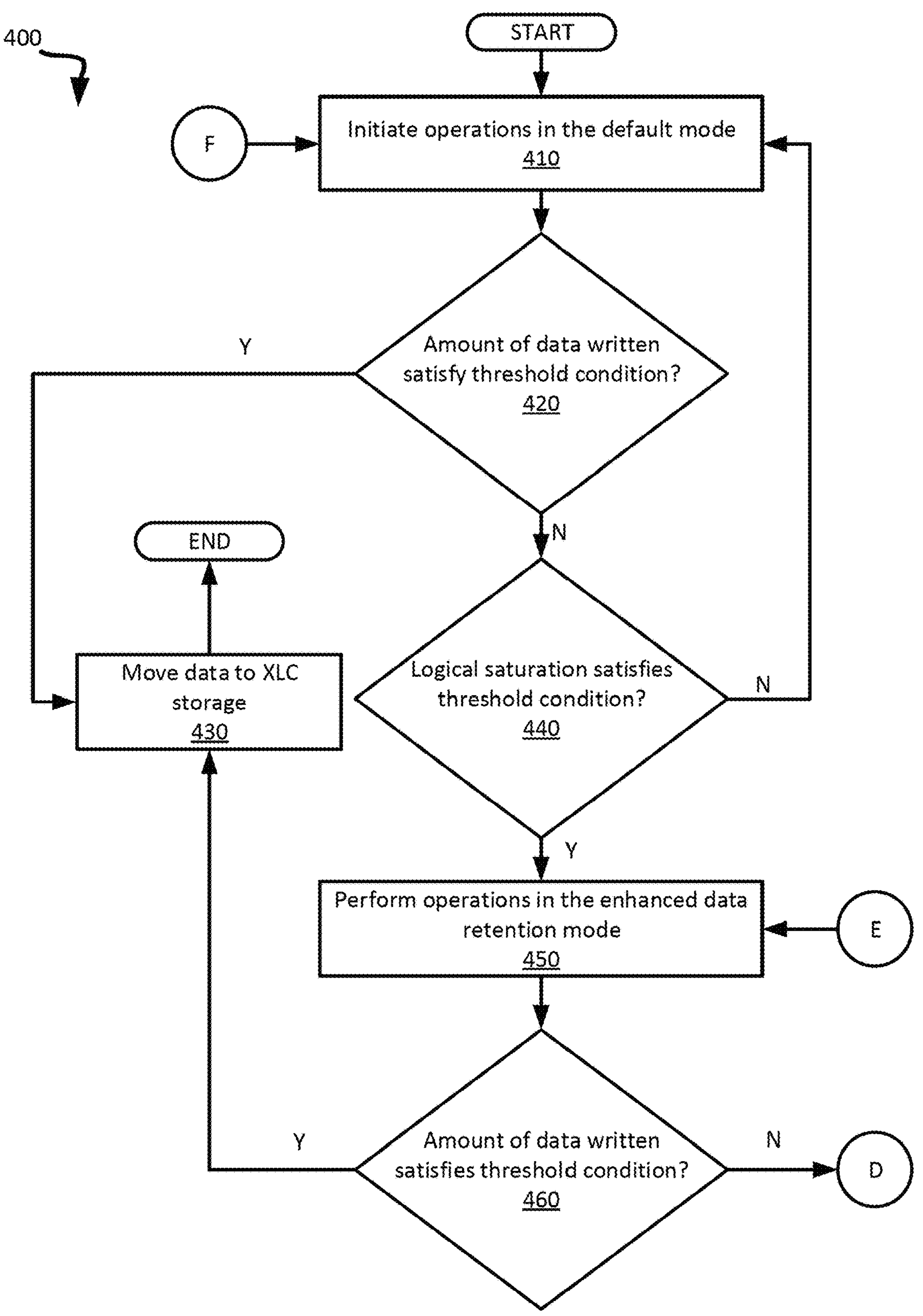
Figure 4:
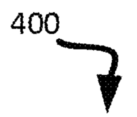
Figure 4:
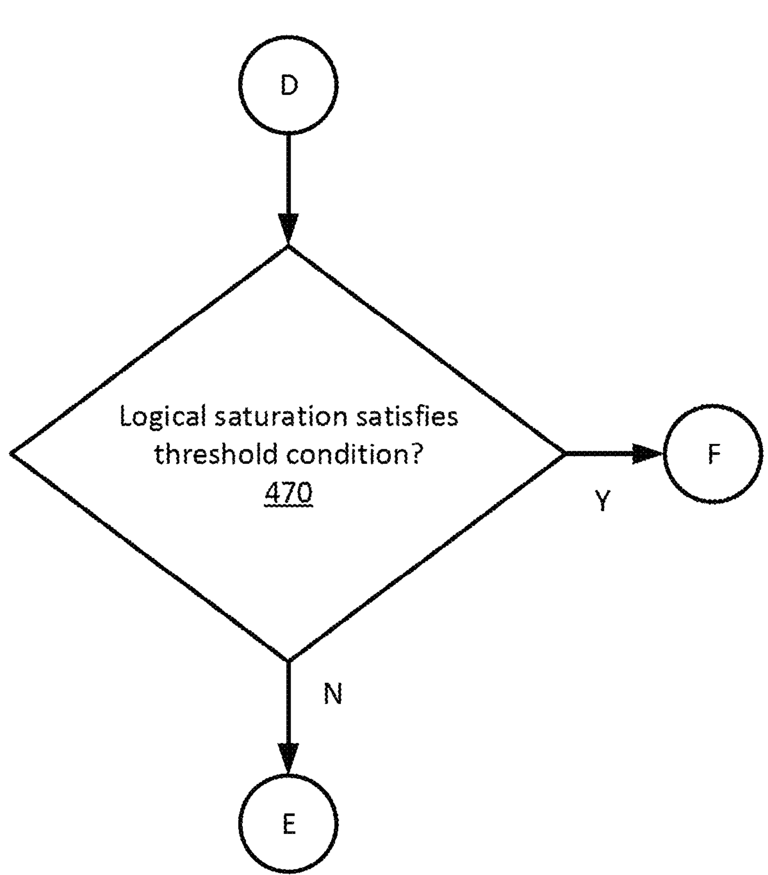

FIG. 4 is a flow diagram of an example method 400 for writing data to SLC cache of a memory sub-system (e.g., operation 220 of FIG. 2), in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the EDR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, processing logic initiates operations while the memory sub-system in the default mode. For example, the processing logic can initiate writes to SLC cache of the memory sub-system in the default mode. The memory sub-system can be empty (e.g., zero logical saturation). It is assumed that the processing logic received data to write to SLC from a host system (e.g., operation 210 of FIG. 2). For example, as described above with reference to FIGS. 1-2, the SLC cache can include static SLC cache having a fixed size and dynamic SLC cache having a default maximum size in the default mode and an enhanced maximum size greater than the default maximum size in the enhanced data retention mode, and the memory sub-system can further include XLC storage. The enhanced maximum size can be less than or equal to a theoretical maximum size determined based on the memory sub-system storage capacity and the type of XLC storage. In some embodiments, the enhanced maximum size is less than the theoretical maximum size.

At operation 420, the processing logic determines whether an amount of data written to the memory sub-system satisfies a threshold condition (similar to operation 320 of FIG. 3). If the amount of data written to the memory sub-system satisfies the threshold condition (e.g., the amount of data written to the memory sub-system is greater than the data threshold), then the processing logic can enable data movement from SLC cache to XLC storage at operation 430 and the process ends.

Otherwise, if the amount of data written to the memory sub-system does not satisfy the threshold condition (e.g., the amount of data written to the memory sub-system is less than or equal to the data threshold), then the processing logic can then determine, at operation 440, whether the logical saturation satisfies a threshold condition. For example, the processing logic can determine whether the amount of data written to SLC cache is greater than the total maximum size of SLC cache. Assuming that data is written to static SLC cache before dynamic SLC cache, this is equivalent to determining whether the amount of data written to dynamic SLC cache is greater than the default maximum size.

If the logical saturation does not satisfy the threshold condition at operation 430 (e.g., the amount of data written to SLC cache is less than or equal to the total size of SLC cache), then the process reverts back to operation 410 to continue writing to SLC cache in the default mode. Otherwise, if the logical saturation does not satisfy the enhanced threshold condition (e.g., the amount of data written to SLC cache is greater than the total maximum size of SLC cache), this means that SLC cache is filled to capacity. At operation 450, the processing logic causes the memory sub-system to perform operations in the enhanced data retention mode. For example, the processing logic can increase the size of dynamic SLC cache from the default maximum size to the enhanced maximum size, and continue writing data to SLC cache.

At operation 460, the processing logic determines whether an amount of data written to the memory sub-system satisfies a threshold condition (similar to operation 420). If the amount of data written to the memory sub-system satisfies the threshold condition (e.g., the amount of data written to the memory sub-system is greater than the data threshold), then the processing logic can then enable data movement from SLC cache to XLC storage at operation 430 and the process ends.

Otherwise, if the amount of data written to the memory sub-system does not satisfy the threshold condition (e.g., the amount of data written to the memory sub-system is less than or equal to the data threshold), then the processing logic can then determine, at operation 470, whether the logical saturation satisfies a threshold condition. For example, the processing logic can determine whether the amount of data written to SLC cache is greater than the total size of SLC cache. Assuming that data is written to static SLC cache before dynamic SLC cache, this is equivalent to determining whether the amount of data written to dynamic SLC cache is greater than the default maximum size.

If the logical saturation does not satisfy the threshold condition at operation 470 (e.g., the amount of data written to SLC cache is less than or equal to the total size of SLC cache), then the process reverts back to operation 450 to continue performing operations in the enhanced data retention mode. Otherwise, if the logical saturation satisfies the threshold condition at operation 470 (e.g., the amount of data written to SLC cache is greater than the total size of SLC cache), this means that SLC cache is filled beyond the total maximum size of SLC cache. Therefore, a portion of the data will be written to XLC storage.

To address this situation, the host system (e.g., host system 120 of FIG. 1) can erase or delete data (e.g., temporary files) to reduce the logical saturation to below the enhanced maximum size. Illustratively, if the logical saturation of the data is 25% of the memory sub-system storage capacity, then the remaining data after the data deletion can be 15% of the memory sub-system storage capacity. Moreover, the process can then revert back to operation 410 to perform operations in the default mode to enable data movement from SLC cache to XLC storage and reduce the size of dynamic SLC cache to the default maximum size.

Figure 5:
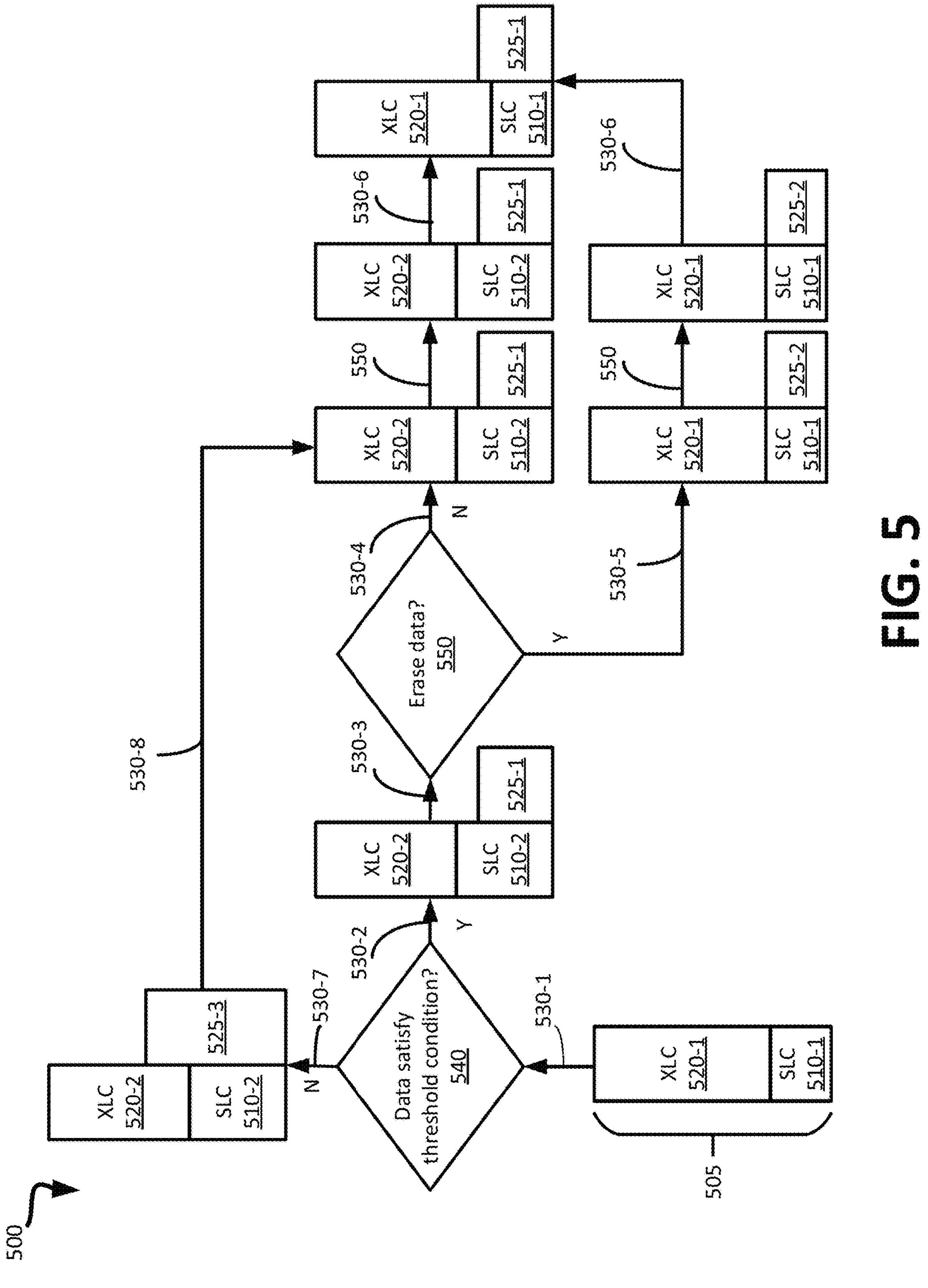
FIG. 5 is a block/flow diagram illustrating an implementation of dynamic adjustment of data storage for enhanced data retention, in accordance with some embodiments of the present disclosure.

FIG. 5 illustrates a block/flow diagram ("diagram") 500 illustrating an example implementation of dynamic adjustment of data storage for enhanced data retention. The diagram 500 shows a memory sub-system 505 including an initial SLC cache 510-1 and an initial XLC storage 320-1.

The initial SLC cache 510-1 and the initial XLC storage 520-1 represent an initially empty state (i.e., before any data writes). The initial SLC cache 510-1 has an initial SLC cache size and the initial XLC storage 520-1 has an initial XLC storage size. For example, the SLC cache 510-1 can include static SLC cache having a fixed size and dynamic SLC cache having a default maximum size.

The memory sub-system controller can then write a certain amount of data to the memory sub-system 505 (e.g., an OS image installed on the memory sub-system 505) at operation 530-1. The memory sub-system controller at decision 540 can determine whether the amount of data satisfies a threshold condition. For example, the memory sub-system controller can determine whether the amount of data is less than or equal to a logical saturation threshold for the SLC cache (e.g., if the OS image is less than or equal than 100 GB).

If the memory sub-system controller determines that the amount of data satisfies the threshold condition (e.g., the amount of data is less than or equal to the logical saturation threshold), then the memory sub-system controller can operate in an enhanced data retention mode to increase the size of the dynamic SLC cache from the default maximum size to the enhanced maximum size. This results in a larger sized SLC cache 510-2 including dynamic SLC cache having an enhanced maximum size, and XLC storage 520-2. The data written to the SLC cache 520-2 is indicated by data 525-1.

The memory sub-system controller can then analyze the data 525-1 at operation 530-3, and determine whether to erase any of the data 525-1 at decision 550. For example, the memory sub-system controller can determine whether to erase any temporary files (e.g., from the OS image). If not, this means that. The data storage process terminates at operation 530-4. If the memory sub-system controller determines that data should be erased at decision 550, then the memory sub-system controller erases a portion of the data 525-1 to achieve data 525-2 at operation 530-5. The memory sub-system 505 is reverted back to the initial state including SLC cache 510-1 and XLC storage 520-1, and the data 525-2 can have about the same size as the size of the SLC cache 510-1.

After operation 530-4 or 530-5, the memory sub-system 505 can then be placed in a high temperature environment (e.g., warehouse) for storage while in a non-operational state, as indicated by event 550. At some point, the memory sub-system 505 is taken out of the high temperature environment and is received by a user. The memory sub-system controller can then place the memory sub-system 505 in the default mode at operation 530-6 to store data 525-1 across the SLC cache 510-1 and the XLC storage 520-1.

Reverting back to decision 540, if the memory sub-system controller determines that amount of data does not satisfy the threshold condition (e.g., the amount of data is greater than the logical saturation threshold), then the memory sub-system controller can still operate in the enhanced data retention mode to achieve SLC cache 510-2 and XLC storage 520-2. However, since the amount of data exceeds the logical saturation threshold for the SLC cache 510-2, some data is stored in XLC storage 520-2, as indicated by data 525-3. The memory sub-system controller can then cause a portion of data 525-3 to be erased at operation 530-8 to achieve a state of the memory sub-system 505 similar to that shown after operation 530-4. Shutdown processing can be needed here with sufficient time to complete the erase operations and relocate any data from the XLC storage to the SLC cache. The memory sub-system controller can use idle time and/or shutdown processing time to complete this before indicating that the shutdown processing is complete. Further details regarding diagram 500 are described above with reference to FIGS. 1-4.

Figure 6:
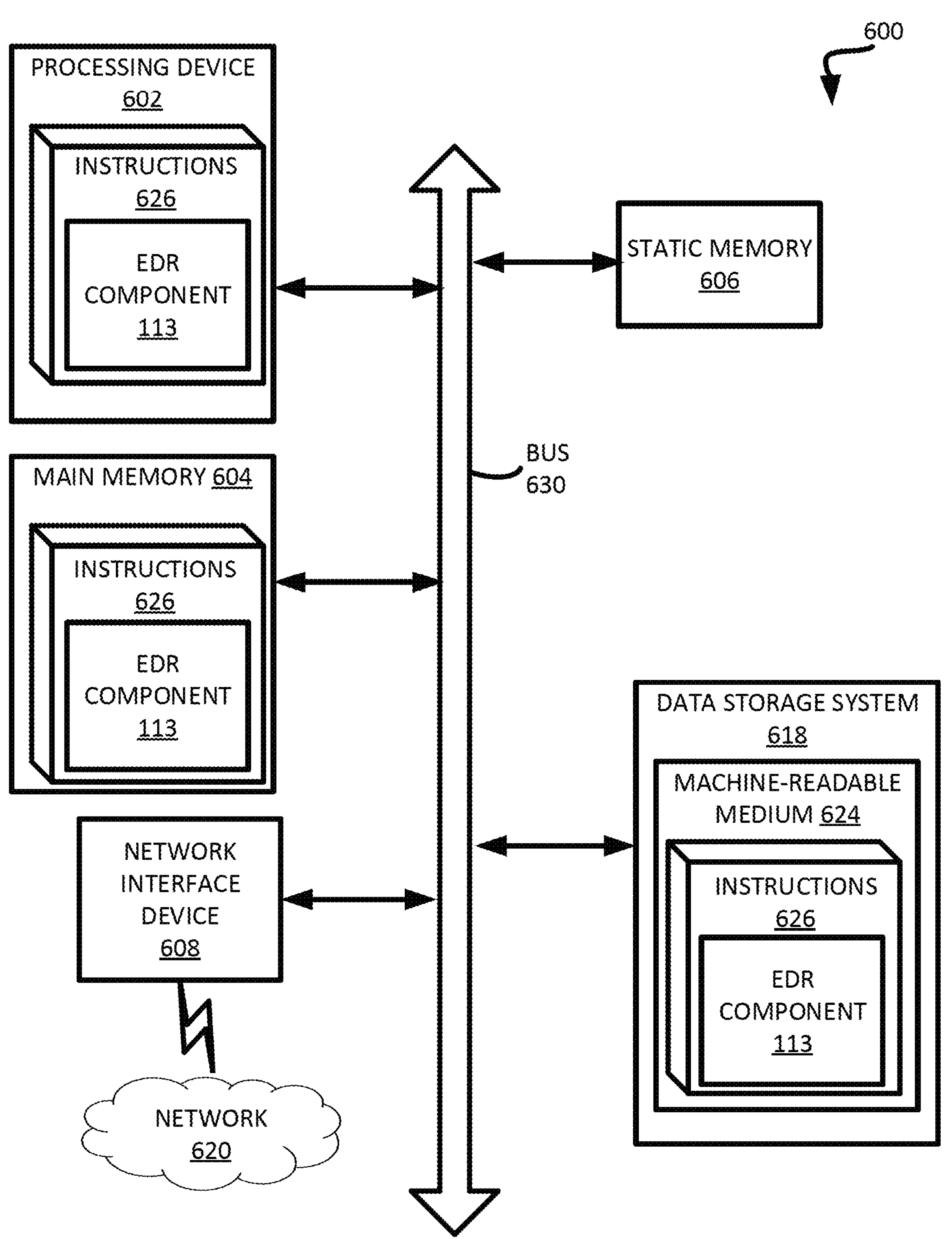
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the EDR component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 426 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an EDR component (e.g., the EDR component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory; and a processing device, operatively coupled with the memory, to perform operations comprising:

initiating a write operation in a first mode to write a first portion of data to a cache, wherein the cache has a first maximum size corresponding to the first mode and a second maximum size different from the first maximum size corresponding to a second mode;

determining that a logical saturation of the first portion of the data satisfies a first threshold condition based on the first maximum size; and in response to determining that the logical saturation of the first portion of the data satisfies the first threshold condition, continuing the write operation in the second mode to write a second portion of the data to the cache.

2. The system of claim 1, wherein the operations further comprise receiving the data from a host system.

3. The system of claim 1, wherein the second maximum size is less than a theoretical maximum size for the cache.

4. The system of claim 1, wherein the operations further comprise completing the write operation, wherein an entirety of the data is written to the cache upon completing the write operation.

5. The system of claim 1, wherein the operations further comprise:

determining whether an amount of data written to a memory sub-system satisfies a second threshold condition; and in response to determining that the amount of data written to the memory sub-system does not satisfy the second threshold condition, determining whether the logical saturation of the first portion of the data satisfies the first threshold condition.

6. The system of claim 1, wherein the operations further comprise:

in response to determining to initiate the write operation in the second mode, initiating the write operation in the second mode to write a third portion of the data to the cache;

determining whether the logical saturation of the third portion of the data satisfies a second threshold condition based on the second maximum size; and in response to determining that the logical saturation of the third portion of the data does not satisfy the second threshold condition, continuing the write operation in the second mode to write a fourth portion of the data to the cache.

7. The system of claim 6, wherein the operations further comprise:

in response to determining that the logical saturation of the third portion of the data satisfies the second threshold condition, continuing the write operation in the first mode to write the fourth portion of the data to the cache;

determining whether the logical saturation of the fourth portion of the data satisfies the first threshold condition; and in response to determining that the logical saturation of the fourth portion of the data satisfies the first threshold condition, continuing the write operation in the second mode to write a fifth portion of the data to the cache.

8. A method comprising:

initiating, by a processing device, a write operation in a first mode to write a first portion of data to a cache, wherein the cache has a first maximum size corresponding to the first mode and a second maximum size different from the first maximum size corresponding to a second mode;

determining, by the processing device, that a logical saturation of the first portion of the data satisfies a first threshold condition based on the first maximum size; and in response to determining that the logical saturation of the first portion of the data satisfies the first threshold condition, continuing, by the processing device, the write operation in the second mode to write a second portion of the data to the cache.

9. The method of claim 8, further comprising receiving, by the processing device, the data from a host system.

10. The method of claim 8, wherein the second maximum size is less than a theoretical maximum size for the cache.

11. The method of claim 8, further comprising completing, by the processing device, the write operation, wherein an entirety of the data is written to the cache upon completing the write operation.

12. The method of claim 8, further comprising:

determining, by the processing device, whether an amount of data written to a memory sub-system satisfies a second threshold condition; and in response to determining that the amount of data written to the memory sub-system does not satisfy the second threshold condition, determining, by the processing device, whether the logical saturation of the first portion of the data satisfies the first threshold condition.

13. The method of claim 12, further comprising:

in response to determining to initiate the write operation in the second mode, initiating, by the processing device, the write operation in the second mode to write a third portion of the data to the cache;

determining, by the processing device, whether the logical saturation of the third portion of the data satisfies a second threshold condition based on the second maximum size; and in response to determining that the logical saturation of third portion of the data does not satisfy the second threshold condition, continuing, by the processing device, the write operation in the second mode to write a fourth portion of the data to the cache.

14. The method of claim 13, further comprising:

in response to determining that the logical saturation of the third portion of the data satisfies the second threshold condition, continuing, by the processing device, the write operation in the first mode to write the fourth portion of the data to the cache;

determining, by the processing device, whether the logical saturation of the fourth portion of the data satisfies the first threshold condition; and in response to determining that the logical saturation of the fourth portion of the data satisfies the first threshold condition, continuing, by the processing device, the write operation in the second mode to write a fifth portion of the data to the cache.

15. A non-transitory computer-readable storage medium comprising instructions that, when executed by a processing device, cause the processing device to perform operations comprising:

initiating a write operation in a first mode to write a first portion of data to a cache, wherein the cache has a first maximum size corresponding to the first mode and a second maximum size different from the first maximum size corresponding to a second mode;

determining that a logical saturation of the first portion of the data satisfies a first threshold condition based on the first maximum size; and in response to determining that the logical saturation of the first portion of the data satisfies the first threshold condition, continuing the write operation in the second mode to write a second portion of the data to the cache.

16. The non-transitory computer-readable storage medium of claim 15, wherein the operations further comprise receiving the data from a host system.

17. The non-transitory computer-readable storage medium of claim 15, wherein the second maximum size is less than a theoretical maximum size for the cache.

18. The non-transitory computer-readable storage medium of claim 15, wherein the operations further comprise completing the write operation, wherein an entirety of the data is written to the cache upon completing the write operation.

19. The non-transitory computer-readable storage medium of claim 15, wherein the operations further comprise:

determining whether an amount of data written to a memory sub-system satisfies a second threshold condition; and in response to determining that the amount of data written to the memory sub-system does not satisfy the second threshold condition, determining whether the logical saturation of the first portion of the data satisfies the first threshold condition.

20. The non-transitory computer-readable storage medium of claim 15, wherein the operations further comprise:

in response to determining that the logical saturation of the first portion of the data satisfies the first threshold condition, continuing the write operation in the first mode to write the second portion of the data to the cache;

determining whether the logical saturation of the second portion of the data satisfies a second threshold condition based on the first maximum size; and in response to determining that the logical saturation satisfies the second threshold condition, continuing the write operation in the second mode to write a third portion of the data to the cache.

* * * * *